Nov. 22, 1955     R. GUILLEMINOT     2,724,214
APPARATUS FOR CONTINUOUS MANUFACTURE
OF CORRUGATED SHEET GLASS
Filed Nov. 27, 1951     3 Sheets-Sheet 1
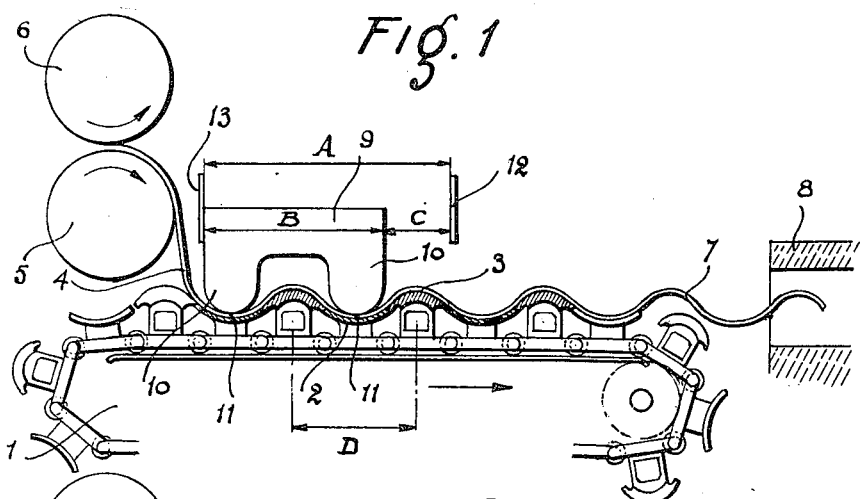
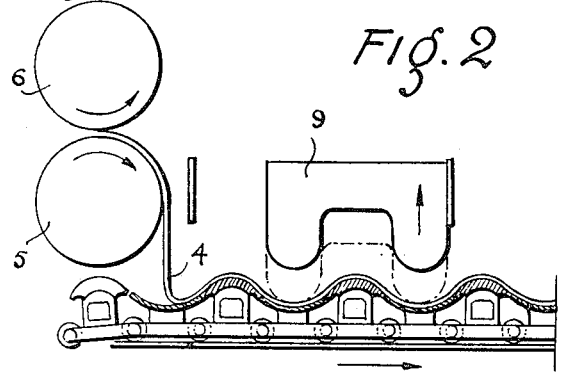
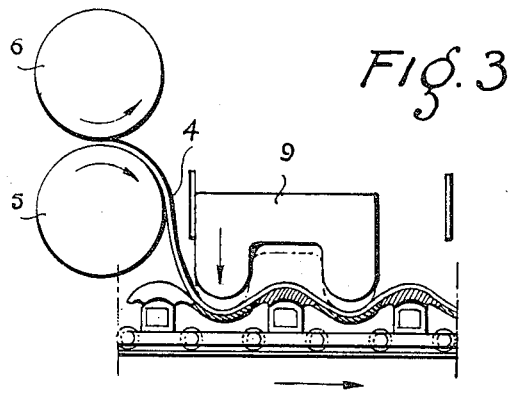
Inventor
Roger Guilleminot
By
Young, Avery & Thompson
Attys.

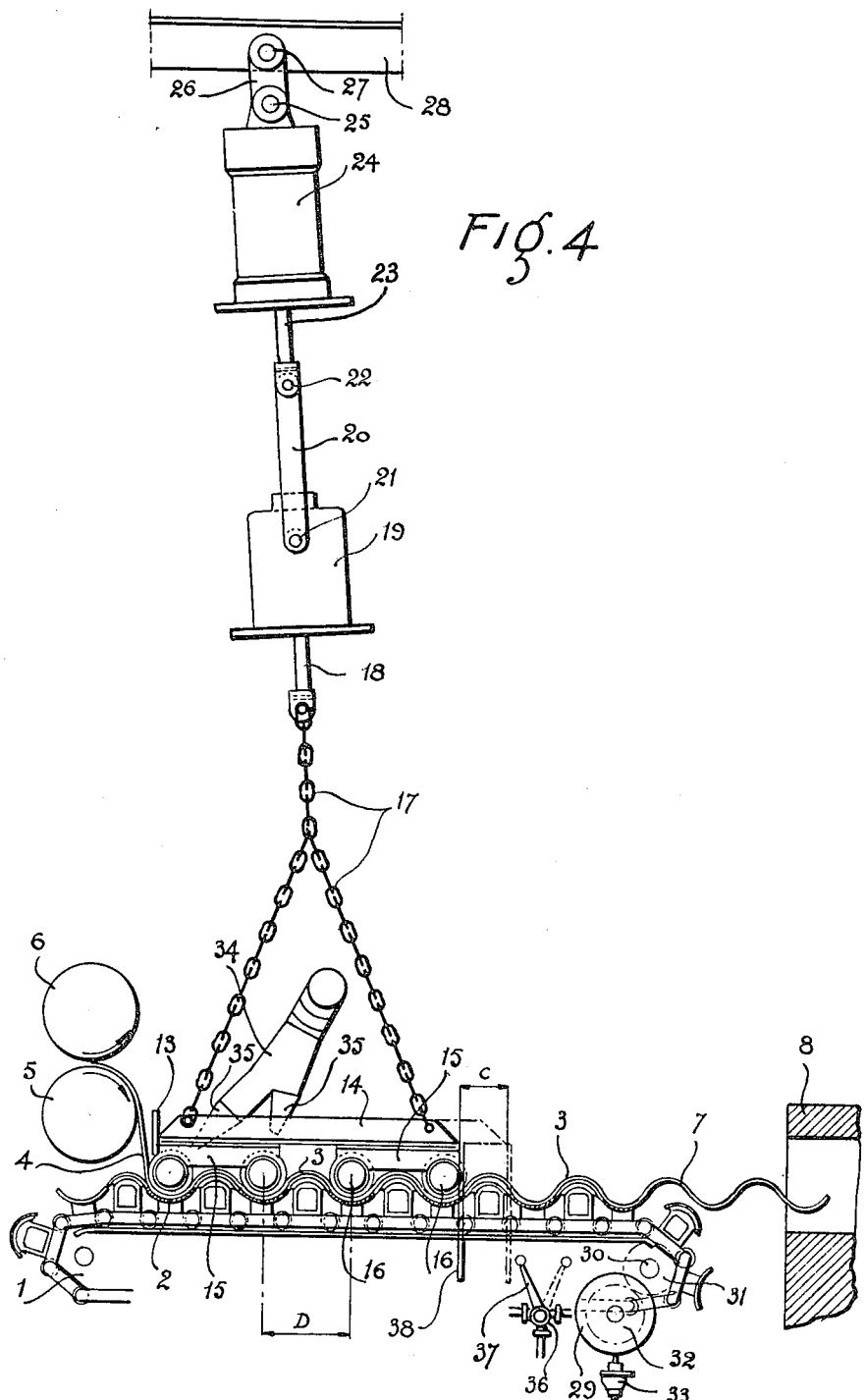

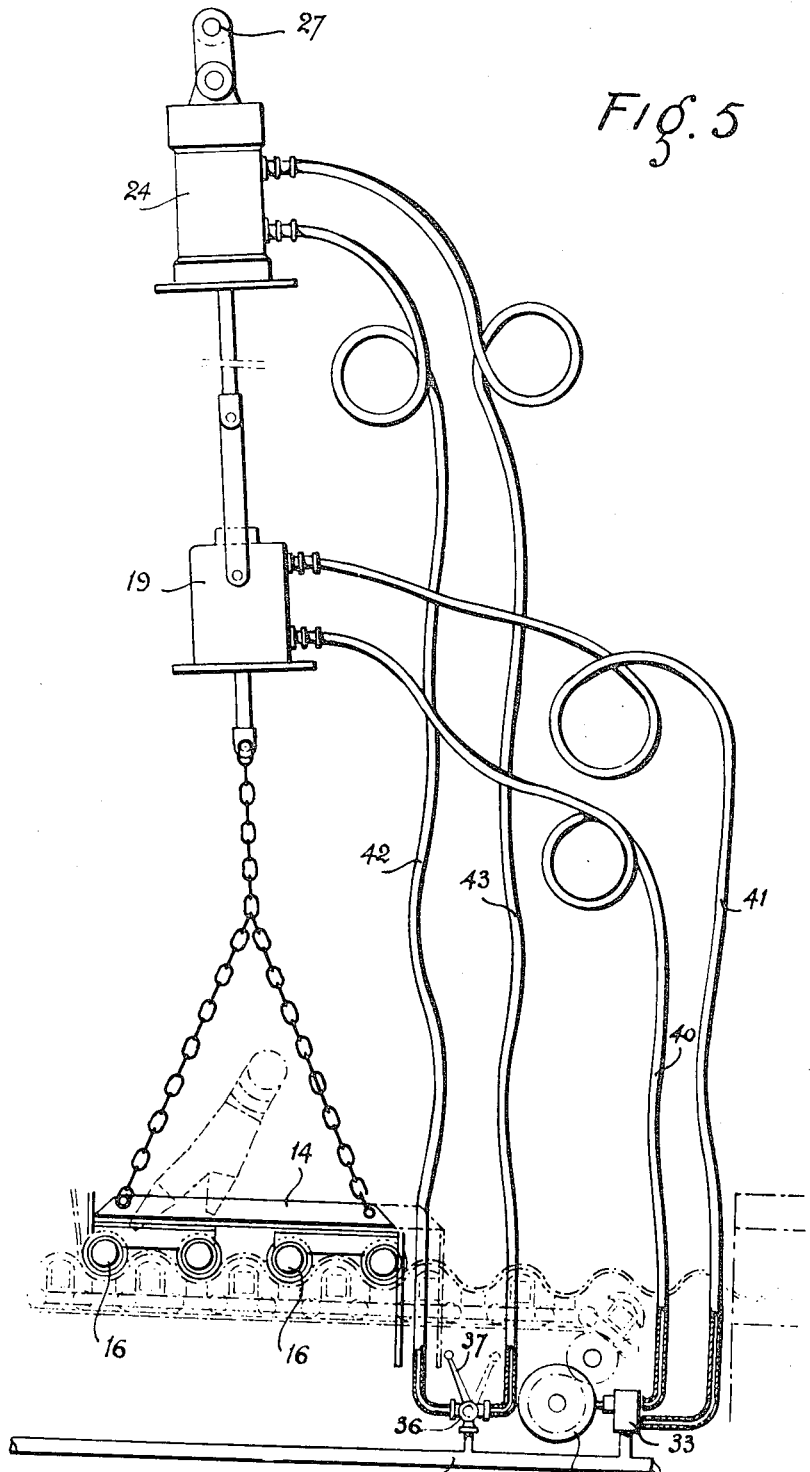

United States Patent Office 2,724,214
Patented Nov. 22, 1955

2,724,214

APPARATUS FOR CONTINUOUS MANUFACTURE OF CORRUGATED SHEET GLASS

Roger Guilleminot, Paris, France

Application November 27, 1951, Serial No. 258,311

Claims priority, application France January 6, 1951

4 Claims. (Cl. 49—3)

A known method of producing corrugated sheet glass is to allow a continuous stream of rolled glass in semi-fluid condition to drop upon a moving corrugated surface which is displaced at the same rate, as that at which the rolled glass is fed. The semi-fluid glass conforms to the corrugations of the moving surface. On cooling to a temperature below softening point, the glass hardens in its final desired configuration. The sheet of corrugated glass thus obtained is then subjected to the usual annealing process.

In U. S. Patent No. 2,590,768, a special apparatus was described whereby corrugated sheet glass was produced in a continuous manner by the above-described method. Said apparatus essentially consists of an endless belt the surface of which is formed with undulations or corrugations. These corrugations are obtained by providing the endless chain in the form of a succession of alternately concave and convex articulated elements which are adapted, during the horizontal lap of the chain's path, to become juxtaposed so as to form a continuous corrugated surface.

Upon this corrugated surface to which a continuous movement of translation is imparted, the semi-fluid glass supplied by the rolling mill is poured. As it contacts the chain, the glass becomes applied to the corrugations of the chain, and quickly cools and hardens, so that at the end of a short length of travel, the corrugated glass sheet has become sufficiently strong and self-sustaining to allow its being stripped from the chain without distortion, and introduced into the annealing furnace.

In order to obtain a uniform production with such an apparatus, it is necessary to provide for a synchronization between the linear velocity of the rolls which serve to feed the glass to the chain surface and the displacement of the corrugated-topped chain.

While satisfactory results can generally be obtained with such synchronization, in some cases it is found that the glass, in spite of the precautions taken, does not exactly conform to the corrugations of the chain, especially in the concave parts thereof. Thus, it can happen that, owing to the condition of the glass, to the incorporation of reinforcement into it or for any other reason, the semi-fluid glass has insufficient malleability and the strip of paste-like glass becomes only imperfectly applied into the valleys of the chain corrugations, resulting in defects and irregularity in the finished product.

It is the object of this invention to overcome these drawbacks. The invention consists of associating with the moving corrugated surface a member having convex portions adapted to be inserted in the concave parts of the initial corrugations of the moving surface and resting against the semi-fluid glass, thus constraining it to contact the bottom of said concave parts. The member is applied to the glass as the latter flows onto the moving surface, that is at the end of the chain adjacent to the rolling-mill. It is maintained on the glass over a limited distance during which it is moved with the moving surface of the chain without any relative motion with respect thereto. The moving member may, in particular, be carried by the endless chain itself, by resting on the latter under its own weight.

The distance covered by the movable member in its travel is preferably about equal to the spacing between the adjacent corrugations of the moving corrugated surface. After this displacement the member is moved back by the amount it had previously been moved forward in order again to act on the strip of semi-fluid glass as the latter reaches the next valley of the moving surface.

The member includes as many convex parts as is required for acting on the number of corrugations of the moving surface which is necessary for allowing the glass to cool sufficiently to bring it to its final corrugated shape, when it will no longer tend to withdraw out of contact with the valleys of the corrugations.

In one specific form of construction, the moving member cooperating with the corrugated surface consists of rollers mounted on a frame, said rollers corresponding in radius to the radius of curvature at the bottom points of the corrugations in the corrugated surface. This frame may be provided with any suitable number of rollers, and may, if desired, be weighted and provided with suitable cooling means.

The frame has associated with its automatic control means for applying the rollers against the glass adjacent to the initial corrugations of the moving surface and near the rolling mill supplying the semi-fluid glass, thereafter maintaining the rollers in engagement with the glass over a displacement corresponding to one corrugation, and then restoring the frame to its initial position to be applied against the next corrugation.

The invention will be described in greater detail with reference to the accompanying drawings wherein:

Figs. 1 to 3 are diagrammatic views illustrating the general arrangement and operation of the moving member;

Fig. 4 is an elevational view of one particular form in which the above arrangement may be constructed and installed;

Fig. 5 shows, in detail, the control and safety means for the device of Fig. 4.

Shown in Figs. 1 to 3 is a plant for the production of corrugated glass sheet of the type described in U. S. Patent 2,590,768. The plant essentially comprises an endless chain 1 of which the successive links alternately carry concave and convex parts 2 and 3 adapted to be juxtaposed to constitute a continuous corrugated surface. The chain moving continuously in the direction indicated by the arrow receives at its lefthand end glass in semi-fluid condition fed to it in the form of a continuous strip 4 from the feed rolls 5 and 6. The glass conforms to the corrugated shape of the surface and, on cooling, hardens to a corresponding shape as at 7. On reaching the righthand end of the chain the corrugated glass sheet has hardened sufficiently to be self-sustaining and may be transferred without external support into the annealing furnace 8.

In order to ensure that the glass should lie in perfect contact with the chain 2—3 at the time the strip 4 reaches the latter, there is associated with the moving surface a member 9 having a number of convex parts 10 the ends 10 of which have a curvature corresponding to the curvature of the concave parts 2 of the chain. This member 9, which may be weighted if required, rests on the glass under its own weight and moves with the chain in the latter's longitudinal displacement. As it presses down on the soft glass within the depressions of the corrugations, it forces it into contact with the moving chain and thus causes it to conform strictly with the valleys 2 of the corrugations, so that the corrugations in the corrugated glass sheet, once set, will be identical and uniform in curvature in both their concave and convex portions.

The displacement of the member 9 driven by the chain is effected over a limited distance A, the limits of which are diagrammatically indicated by two stops 12 and 13.

If the length of element 9 is B, the distance covered by it between 12 and 13 is a distance C such that $C = A - B$. This distance C is less than the pitch D of the corrugations of the chain, D representing the complete cycle or "wave-length" of the sinusoidal or other cyclic curve of the corrugation contour. In practice C will be in the range of from $$\frac{D}{2} \text{ to } D$$

The displacement of the member 9 is correlated with the continuous displacement of the chain 2—3 through mechanical, hydraulical or pneumatical means, not illustrated in Figs. 1 to 3 but one example of which is shown in Fig. 4.

As shown, the member 9 is laid on the glass as soon as a concave part 2 of the chain has received the soft glass strip from the rolls 5—6. The movement of the chain carries the member along with it, said member becoming applied onto the glass which is thereby constrained to remain in contact with the bottom of the concave parts 2 of the chain. This movement occurs while the chain is advancing in the direction shown by the arrow, by a distance equal to C, that is equal to or less than the pitch D. After this distance has been covered, the member 9 is raised by automatic control means (operated by the stop 12 or otherwise) as shown in Fig. 2, and moved back rearwards as far as the stop 13. As soon as the chain has advanced by a distance D equal to the pitch of the corrugations, that is as the next concave part 2 has reached the position previously occupied by the preceding concave part, the element 9 is lowered back on to the chain (Fig. 3), to begin a fresh cycle identical with the previous one.

In Figs. 1 to 3 member 9 is shown as provided with two convex parts 10 adapted simultaneously to cooperate with two concave parts of the corrugated chain. The number of concave parts with which the member is arranged to cooperate may be larger depending on the character of the glass and the conditions of use said number is so predetermined that as the chain has advanced by the distance A, the glass sheet formed on the chain will have reached a state of sufficient hardness to preclude any subsequent distortion.

In the form of construction shown in Figs. 4 and 5, the member 9 cooperating with the chain consists of a frame 14 carrying supports 15 on which rollers 16 are mounted with a spacing equal to one pitch-length of the chain corrugations. In the example shown, four rollers 16 are provided. However the number may differ, e. g. from two to five depending on requirements.

The assembly including frame 14, supports 15 and rollers 16 is suspended through a set of chains 17 from the piston rod 18 of a pneumatic control mechanism the cylinder of which is shown at 19. This cylinder is carried by a rod 20 pivoted at 21 to the cylinder and at 22 to the piston rod 23 of a second pneumatic mechanism 24. This mechanism in turn is carried by a pivoted joint 25 and a clevis 26 from a fixed shaft 27 supported on the framework 28 of the workshop or any other suitable support.

In order to synchronize the return movement of the member 14 provided with the rollers 16, with the displacement of the corrugated chain 2—3, cams 29 are driven from the drive shaft 30 of the drive drum of chain 1 by means of gears 31, 32. The cams 29 actuate a valve 33 for admitting and exhausting into and from the cylinder 19 compressed air supplied through a conduit 39. The valve 33 is connected to the cylinder 19 by flexible pipes 40, 41.

The moving member 14—16 is lowered down on the glass sheet 4 fed from the rolls 5—6 as soon as a concave portion 2 has been supplied with glass. Under the weight of the structure 14—15—16, the rollers apply the glass into the bottom of the valleys in the corrugated chain. The chain carries this structure with it over a distance C less than the pitch length D of the corrugations. When this distance has been covered, the cams 29 operate the valve 33, which acts to let compressed air into the cylinder 19 through the flexible pipe 40, which results in lifting rod 18 with chains 17 and the whole structure 14—15—16. Due to the arrangement of shaft 27 which is systematically displaced with respect to the centre of gravity of the frame, the frame 14 thus lifted tends under its own weight to swing back towards the stop 13. When a further concave portion 2 has moved into the place vacated by the preceding one and has been supplied with semi-fluid glass, that is after the chain has advanced by a pitch length D, the cams 29 actuate the valve 33 to exhaust the compressed air from cylinder 19 through flexible pipe 41. The assembly including frame 14 and rollers 16 then is lowered down onto the chain to accomplish a fresh cycle.

The distance C covered by the rollers in engagement with the chain can be adjusted by acting on the shape of the cams 29. It is seen that with the arrangement used, the semi-fluid glass sheet is pressed into the bottom of the concave parts 2 of the chain as many times as there are rollers 16 provided. The weight of frame 14 with supports 15 and rollers 16 is so adjusted that a sufficient degree of compression will be obtained to cause a total contact of the glass with the corrugated chain surface throughout the successive depressions thereof.

The rollers 16, and more especially those located nearest to the input of the glass sheet 4 may be subjected to the cooling action of air jets from blower pipes 34 provided with nozzles 35, or water circulation.

To enable the roller-frame to be lifted as starting or in case of defective operation, an auxiliary valve 36 is provided for controlling the admission and exhaust of compressed air into and from the second pneumatic cylinder 24 from the supply pipe 39, through flexible pipes 42, 43. The valve 36 may be operated manually or automatically. For the latter purpose it is provided with a lever 37 upon which a stop 38 integral with the frame 14 is adapted to act.

It can thus be seen that should for any reason the frame tend to follow the chain's movement without returning rearwards at the proper moment, the stop 38 would actuate the lever 37 and thereby valve 36, thus causing admission of compressed air into the cylinder 24 through flexible pipe 42 and, therefore, would raise the structure consisting of the roller frame and cylinder 19, completely separating the rollers 16 from the chain. The return of lever 37 to its initial position would, owing to the consequent admission of compressed air through flexible pipe 42, cause the roller-frame to be eased down onto the glass sheet.

Owing to the displacement of the centre of gravity of the chain relatively to the pivot 27, the frame would tend to return to its left-hand end position in engagement with stop 13, in readiness to being again started in operation at the proper point.

It is to be understood that the specific construction described and illustrated is in no way restrictive, and has been given merely by way of example. Many modifications may of course be introduced as concerns the means for controlling the roller frame and synchronizing the displacements thereof with the movement of the corrugated chain, which control and synchronizing means may be electrical, mechanical or otherwise.

What I claim is:

1. Apparatus for continuously producing corrugated glass sheet comprising a pair of feed rollers adapted for continuous output of a sheet of rolled glass, endless conveyor means underlying said rollers, a plurality of alternately concave and convex elements carried on the conveyor means, said elements being adapted to lie in juxtaposed relationship in a horizontal lap of the conveyor means for defining a continuous corrugated surface and to separate from one another towards the end of said horizontal lap, a frame having a plurality of convex portions thereon corresponding with the concavities of said elements, said frame being movable with the conveyor, lifting means for raising and lowering the frame, control means actuated in synchronism with the conveyor for actuating the lifting means to lower the frame upon the glass sheet at the region of the conveyor where the sheet first engages said elements, and control means actuated in synchronism with the conveyor for actuating the lifting means to raise and retract said support after the support has advanced with the conveyor means by the amount of one corrugation of the glass sheet.

2. Apparatus for continuously producing corrugated glass sheet comprising a pair of feed rollers adapted to put out continuously a sheet of rolled glass, endless conveyor means underlying the rollers, a plurality of alternately concave and convex elements carried by the conveyor means, said elements being adapted to lie in juxtaposed relationship over a horizontal lap of the path of the conveyor means to define a corrugated suface, and to separate from one another towards the end of said horizontal lap, a frame having a plurality of freely rotatable cylindrical parts thereon corresponding with the concavities of said elements, said frame being movable with the conveyor, lifting means for raising and lowering the frame, control means actuated in synchronism with the conveyor for actuating the lifting means to lower the frame upon the glass sheet at the region of the conveyor where the sheet first engages said elements, and control means actuated in synchronism with the conveyor for actuating the lifting means to raise and retract said support after the support has advanced with the conveyor means by the amount of one corrugation of the glass sheet.

3. Apparatus for continuously producing corrugated sheet glass comprising means for continuously feeding a rolled glass sheet, a movable endless chain conveyor for receiving said sheet and comprising a plurality of inter-pivoted alternately concave and convex elements adapted to lie in juxtaposed relationship over a horizontal lap of said chain's displacement to provide a moving continuous corrugated surface, a roller-carrying frame, a plurality of parallel rollers on the lower portion of said frame, said rollers being spaced apart a distance equal to the distance between corresponding portions of said concave elements, mechanism for laying said frame on said sheet as the sheet first contacts the chain with said rollers applied on said sheet in registry with said concave chain elements to retain said sheet in contact with the bottom of said concave elements, said mechanism including supporting means for swingably suspending the frame over the conveyor, fluid-pressure actuated lifting means incorporated in said supporting means for lifting and lowering said frame, valve means for controlling the supply and discharge of fluid under pressure to said lifting means, cam means actuated in synchronism with the displacement of said conveyor, limit means for engaging the frame to position it for engagement with the glass on the conveyor, means on the cam operable after the conveyor has moved the frame away from the limit means a predetermined distance for actuating the valve to supply fluid under pressure to the lifting means to lift the frame and allow it to swing against said limit means, and means on the cam to actuate the valve to discharge fluid from the lifting means and lower the frame onto the glass on the conveyor.

4. Apparatus for continuously producing corrugated sheet glass comprising means for continuously feeding a rolled glass sheet, a movable endless chain conveyor for receiving said sheet and comprising a plurality of inter-pivoted alternately concave and convex elements adapted to lie in juxtaposed relationship over a horizontal lap of said chain's displacement to provide a moving continuous corrugated surface, a roller-carrying frame, a plurality of parallel rollers on the lower portion of said frame, said rollers being spaced apart a distance equal to the distance between corresponding portions of said concave elements, mechanism for laying said frame on said sheet as the sheet first contacts the chain with said rollers applied on said sheet in registry with said concave chain elements to retain said sheet in contact with the bottom of said concave elements, said mechanism including supporting means for swingably suspending the frame over the conveyor, fluid-pressure actuated lifting means incorporated in said supporting means for lifting and lowering said frame, valve means for controlling the supply and discharge of fluid under pressure to said lifting means, cam means actuated in synchronism with the displacement of said conveyor, limit means for engaging the frame to position it for engagement with the glass on the conveyor, means on the cam operable after the conveyor has moved the frame away from the limit means a predetermined distance for actuating the valve to supply fluid under pressure to the lifting means to lift the frame and allow it to swing against said limit means, means on the cam to actuate the valve to discharge fluid from the lifting means and lower the frame onto the glass on the conveyor, a second fluid pressure actuated lifting means incorporated in said supporting means in tandem with the first mentioned lifting means, a second valve for supplying and discharging fluid under pressure to said second lifting means, and means carried by the frame and engagable with the second valve after the frame has moved a predetermined distance with the conveyor to shift the second valve to a position to supply fluid under pressure to the second lifting means to raise the frame from the conveyor.

References Cited in the file of this patent

UNITED STATES PATENTS

| | | |
|---|---|---|
| 1,450,222 | Pattison | Apr. 3, 1923 |
| 2,350,996 | Atkinson et al. | June 13, 1944 |
| 2,586,481 | Rooksby et al. | Feb. 19, 1952 |
| 2,590,768 | Guilleminot et al. | Mar. 25, 1952 |

FOREIGN PATENTS

| | | |
|---|---|---|
| 622,094 | Great Britain | Apr. 27, 1949 |